FIG. 1

INVENTOR.
Jerome H. Lemelson

FIG. 2

INVENTOR.
Jerome H. Lemelson

INVENTOR.
Jerome H. Lemelson

INVENTOR.
Jerome H. Lemelson

FIG. 7

INVENTOR.
Jerome H. Lemelson

United States Patent Office 3,054,061
Patented Sept. 11, 1962

1

3,054,061
MAGNETRON BEAM SWITCHING TUBE PULSE CODE GENERATOR EMPLOYING BEAM SWEPT ACROSS COMMONLY CONNECTED TARGET ANODES
Jerome H. Lemelson, 43A Garfield Park Homes, Metuchen, N.J.
Filed Feb. 10, 1958, Ser. No. 714,085
17 Claims. (Cl. 328—64)

This invention relates to electrical beam switching devices adapted to effect automatic code generation. This is a continuation-in-part of my copending application Serial Number 515,417 entitled Computing Apparatus and filed on June 14, 1955, now Patent No. 3,003,109.

The magnetron beam switching tube has been applied to various sampling, switching and multiplexing functions in which an analog or pulse signal input is gated through one or more anodes of said tube on a beam generated across said tube. Most of these applications utilize an external pulse signal for the positional selection of a target by using said pulse to lower the potential of the spade or grid associated with the position on which said beam is formed. The signal originating at the cathode is then sampled as it passes through the selected target output until another pulse is applied to a grid or spade leading the target on which the beam is formed whereupon the beam automatically forms or steps to the new target.

This invention employs a beam generated between cathode and targets of a magnetron beam switching tube and the phenomenon of interruption of said beam in switching from target to target to produce an inflection in the output signal generated on a common target output line to produce an amplitude variation or pulse on said line. The phenomenon may be used to provide various code forming or emitting devices at low cost and with a minimum number of switching components.

It is accordingly a primary object of this invention to provide an improved means for generating pulse trains or in-line pulse codes utilizing a beam switching tube and the interruption of the beam as it switches to create a discrete signal or pulse.

Another object is to provide a digital pulse train forming device which may be used either in conventional selection switching such as telephone line switching or higher speed switching.

Still another object is to provide simple means for rapidly generating from one to nine pulses in a pulse train in less than a millisecond for use in high speed selection and computing devices.

Another object is to provide a magnetron beam switching tube with associated circuitry for providing an output therefrom as its beam switches which output is a plurality of pulses in the form of a digital or binary code having the no-pulse or zero parts of said code of a time duration or approximately equal to the time duration of the pulse parts of said code.

Yet another object is to provide an improved shift register using a beam switching tube as a major component thereof and having a minimum number of switching components.

Still another object is to provide a code forming device for providing a predetermined code or pulse train each time it is energized with means for rapidly changing the code emitted thereby, said device being operable in the mega-cycle range and capable for use in high speed computing and selection systems which are also operable in the megacycle range.

Another object is to provide a simple code emitting-device utilizing a switching beam and substantially void of moving parts which when energized by a trigger pulse will emit a pulse train in the form of a specific code.

Still another object is to provide a shift-register having a minimum of parts and capable of operation in the megacycle range.

Other objects of my invention will be apparent from the detailed description of the drawings which follow in connection with the drawings in which:

FIG. 6' is another form of the pulse code forming apparatus.

Figure 1:
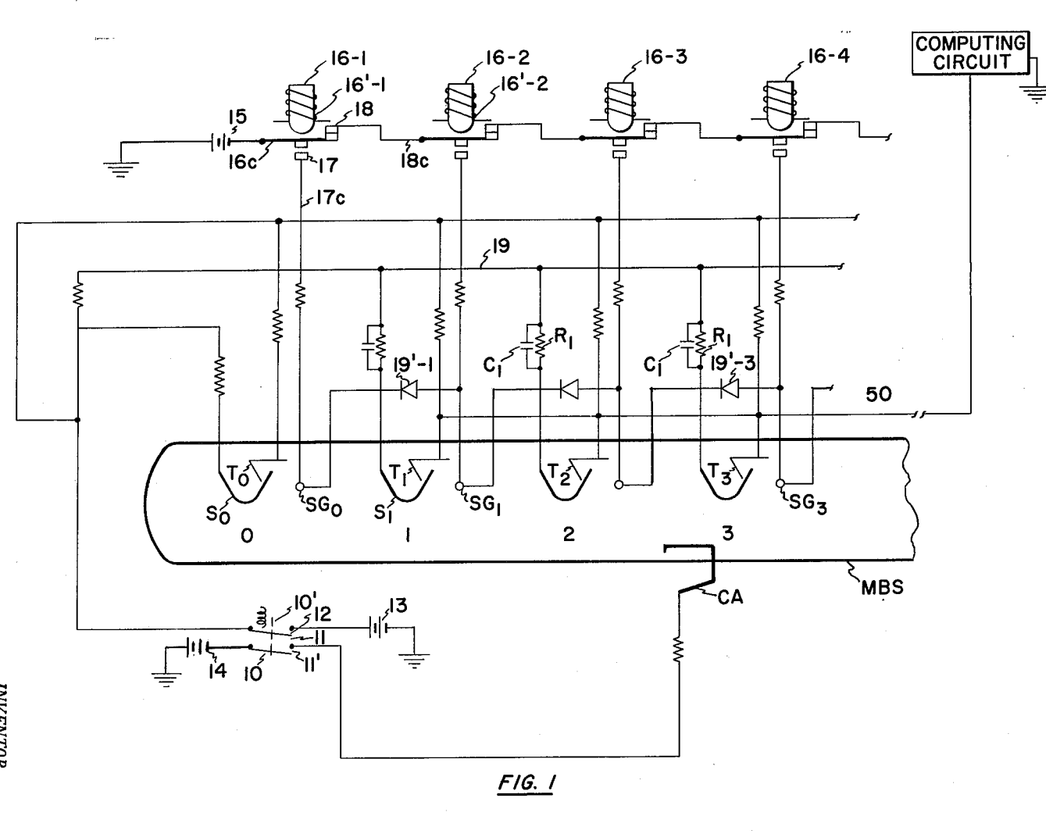
FIG. 1 shows a circuit diagram of my novel apparatus as applied to a telephone selection system.

In FIG. 1 a magnetron beam switching tube MBS is provided such as the Burroughs types 6700–6701 having ten target positions or any similar beam switching device having any number of desired positions. Each position, numbered 0 to 9, has an associated target T–, spade S– and switching grid SG– designated by the associated numeral subscripts. Also shown are associated push-button operated switching means for effecting, when depressed, the simultaneous lowering of the potential of each position's switching grid and the potentials of all grids to the left or counterclockwise of said position, but not leftward beyond the zero position. As a result, after the beam is formed across the zero target and the potential of all grids to the left of a selected grid are simultaneously lowered by a switching means 16 associated with said selected position, an output will be derived over a common target circuit 50 which will consist of an interrupted signal or pulse train, the interruption occurring each time the beam steps from one position to the next. The number of pulses or discrete signals formed on the output circuit 50 will be a function of the position selected by the actuation of the switch associated therewith. Thus from one to ten pulses may be provided over output 50 for switching or computing means, the number depending upon the position selected and the switch 16– thereof actuated.

The zero target T0 may be connected to line 50 or to a further circuit or ground if it is desired only to form the short pulses over 50 generated as the beam switches or passes the targets to the right of T0.

The switches 16 are a plurality of push button devices 16'— designated by respective subscripts, which are spring loaded up and which, when depressed, complete a circuit 16c and 17c between a power supply 15 for applying a negative potential to the associated grid and all grids to the left thereof and break circuit 16c and 18c to all pushbutton switches to the right. Each grid SG— is shown connected to the contact 17 which is normally open relative the switch arm 16c and via a diode or unidirectional electronic gate 19'— to the grid to the left of said grid. Thus if switch 16–3 is actuated, the grid SG3 will be connected with the negative terminal of potential source 15 and all grids to the left of SG3 will also simultaneously be lowered in potential whereas the diode 19'-3 to the right of SG3 connecting it with grid SG4 will prevent the potential drop across SG4 and all grids to the right thereof.

The beam may be first formed across the zero target T0 by closing a multi-pole monostable switch 10 which may be the push-button switch asociated with a telephone receiver which closes when the mouth-piece is removed from the telephone base. The switch arms 11 and 12 complete circuits with power supplies 13 and 14 when 10 closes, and the spade circuit 19 and cathode CA respectively. Resistance-capacitance, circuits of the desired time constants are shown provided in the spade circuits for controlling the switching rate, which is a function of the values of the condenser C1 and resistor R1 of each RC circuit. (It is noted that the RC circuit of each spade may vary from one to the next to provide pulse outputs of different lengths as the beam switches or steps from one position to the next if desired for different coding requirements.) The notation 250 refers to a switching or computing device such as a conventional or modified telephone selection system having a circuit input from the comon target output 50. 250 may also comprise the telephone sound transducer (not illustrated).

It is noted that the push-button operated switches 16 may be replaced by solenoid actuated electro-mechanical or electronic switching means. The pulse train output over 50 may be of a very high frequency or short individual pulse duration (i.e. nine or less pulses may be formed and transmitted in a time duration on the order of milli-seconds or less as compared to the order of a fraction to two seconds required of the conventional dial rotary switch to form selection pulses).

Figure 2:
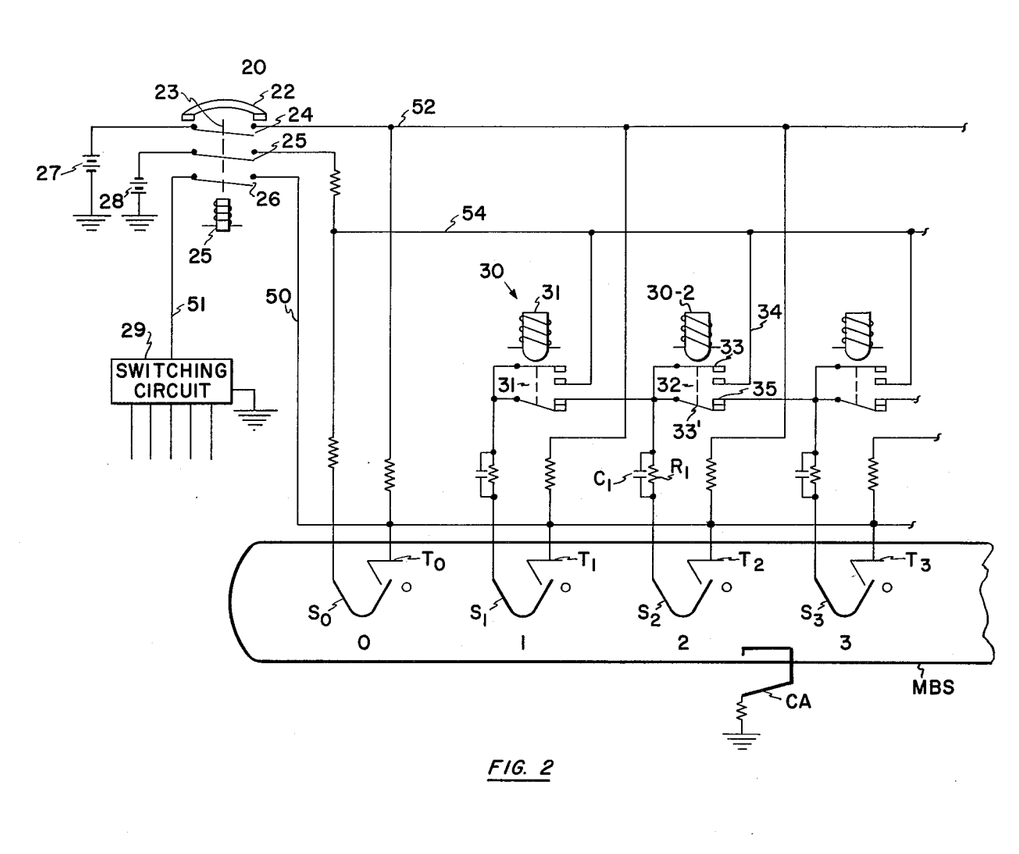
FIG. 2 is a circuit diagram of apparatus similar to FIG. 1.

In FIG. 2 a magnetron beam switching tube MBS is provided such as the Burroughs types 6700–6701 having a thermionic cathode CA, multiple targets T— (designated T0 to T9), multiple spades S—, designated S0 to S9, and multiple switching grids SG—, designated SG0 to SG9. The tube is adapted to operate as a pulse forming device for selection-switching or other functions, by forming a beam across the cathode CA and the zero target T0 and causing the beam thereafter to sweep through a selected number of targets, a pulse being formed over the common target output line 50 each time the beam steps between each or every other target.

A beam may be formed between CA and T0 when the switch 20 is actuated. For example, when a telephone head piece 22 is lifted, the spring loaded actuator 23 closes switches 24 25, and 26 which respectively connect circuits 52 and 54 with respective power supplies 27 and 28 causing the formation of the beam on the zero target. Switch 26 connects the target output 50 with a line 51 extending to a computing or switching device 29 such as a telephone switching system.

Push button or relay actuated switches 30 are provided one across each spade circuit to effect, when actuated, the lowering of the potential of the spade associated therewith and all spades to the left or lower side thereof are lowered in potential a degree such that the beam formed on target T0 will step from target to target until the position selected has been reached thereby causing a discontinuity in the signal produced over the output circuit 51 or generating a series of pulses on line 51 which are transmitted to the switching device or system 29. In FIG. 2, each switch 30 comprises a spring loaded pushbutton 31, which may also be a solenoid, adapted when depressed or actuated to close a monostable double pole switch 32 which closes contacts 33 and 34 and breaks contacts 33' and 35. The closing of the contacts on lines 33, 34 completes a circuit between the common spade circuit 54 and the spade whereby the potential of the spade is connected to a potential sufficiently low with respect to the cathode to effect beam switching. Simultaneously, the potential of all spades to the left of the actuated switch 30 are lowered by means of their normally closed circuits 33', 35 which are connected in series with the spade circuits as shown. All spade circuits to the right of the selected switching position are disconnected from the common circuit 33' when the switch contactors 33', 35 thereof are separated when said selected switch is actuated. Since all spades to the left of the selected target, including the spade of the selected target, have been lowered in potential, the beam formed on the zero target will step automatically to the selected target and will stop thereat until the pushbutton or actuator 31 is released whereupon the beam will automatically reset to the zero position. If it is desired that the last pulse produced on the line 51 be of substantially the same duration as all other pulses produced thereon as a result of the beam switching from target to target, a clipper or differentiating circuit may be provided in 51 or in the selection system 29. In order to slow down stepping speed so as to separate the output pulses a greater degree, if necessary, each spade circuit has an RC circuit associated therewith and the values of the resistance and capacitance (R1 and C1) thereof will determine the rate at which the potential of the spade lowers and hence the stepping rate. Since the time required for the beam to step from one target to the next may be too short for certain systems such as 29 to discern the "off" or zero signal condition while the beam is stepping, the output of every other target may be connected to ground rather than all to the output circuit 51 so that the pulses formed will be of a duration equivalent to the duration between pulses less the brief stepping time. For this arrangement, in order to obtain a device which will provide up to nine discrete pulses, a twenty target tube or two ten target tubes are connected together with the last targets of the first tube connected via switching means as illustrated to the first target of the other tube. The spades are similarly connected as illustrated.

If for certain types of operation, it is necessary to initially connect all spades to a spade supply voltage when forming the beam on the zero target, said supply voltage may be provided and connection may be made thereto through an additional pair of normally open contacts on switch 20. Spade supply voltage may also be obtained from one of the power supplies illustrated by connecting all spade circuits on the RC circuit side of the illustrated switches of said power supply through a proper resistor.

Figure 3:
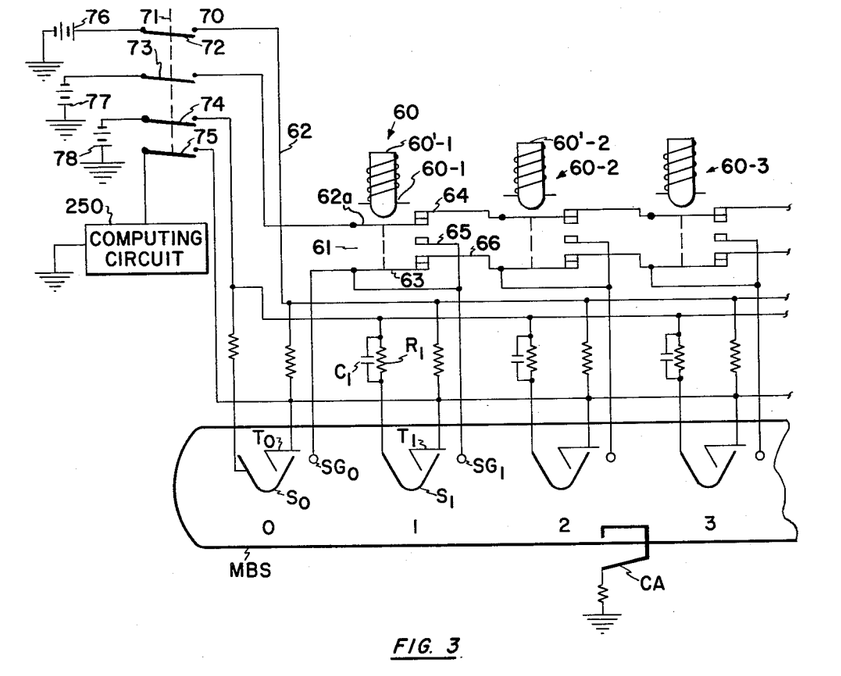
FIG. 3 is a schematic drawing which shows still another modification of the apparatus of FIGS. 1 and 2.

In FIG. 3 automatic stepping of the beam formed across the zero switching target T0 of a magnetron beam switching tube MBS is effected by a switching means associated with each target position which, when actuated, effects lowering of the potential of the grid SG— associated therewith, and of all grids to the left thereof. The switching means 60 of each position is shown as a push-button 60'— spring loaded "up," which when depressed, actuates a monostable switch 61 comprising two spring arms 62a and 63 which break away from contacts 64 and 66 when actuated. When 60' is depressed, arm 62a completes a circuit with contactor 65 and grid SG— associated therewith which is connected through the non-actuated switches to the left thereof to all the other grids. If the switch 70 is closed, the grid of the selected switching position and all grids to the left thereof are connected to a source of negative potential 77 and the beam formed across cathode CA and target T0 steps past each target to the selected position. The result is a series of discrete signals formed across the target output circuit 50 each time the beam steps from one target to the next which are passed through the contacts 75 to the switching or computing circuit 250. All spades S are connected to a source of potential 78 when switch 70 is closed through contacts 74 of 70. Contacts 72 gate the target operating potential 76 to the respective target circuits.

Figure 4:
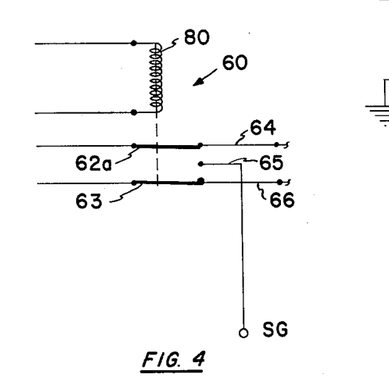
FIG. 4 shows means for modifying a selection position of the apparatus of FIGS. 1 to 3 employing means for activation rather than push button switching or selection means.

In FIG. 4 a solenoid or other type of switching relay 80– is used to actuate the contactors 62a and 63 of the position switch 60 of FIG. 3 and the device may be remotely controlled or controlled by automatic means to emit a discrete number of pulses when a respective relay 80– is energized.

Figure 5:
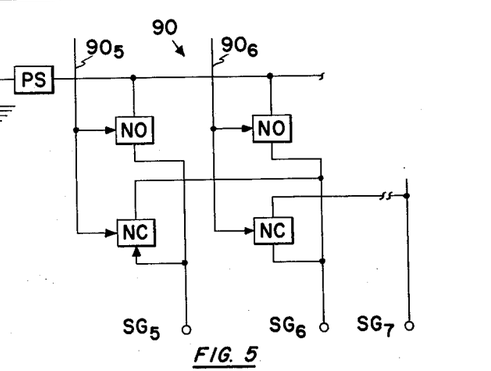
FIG. 5 is a diagram showing logical switching means for controlling the apparatus of FIGS. 1 to 3.

In FIG. 5 electronic means comprising normally open vacuum tube or semi-conductor gating means NO– and normally closed tube and/or semi-conductor gating means NC– which are actuated by input pulses over respective input circuits 90 designated by respective subscripts for each switching position. The normally open switches NO– gate a negative power supply PS' to the respective switching grid when closed whereas the normally closed switch of the position energized, opens to prevent the powering of the potential of all grids to the right while all grids to the left of the selected position are lowered through the normally closed and unactuated switches to the left thereof which are in circuits of the respective grids connected to the grid of the selected position.

Figure 6:
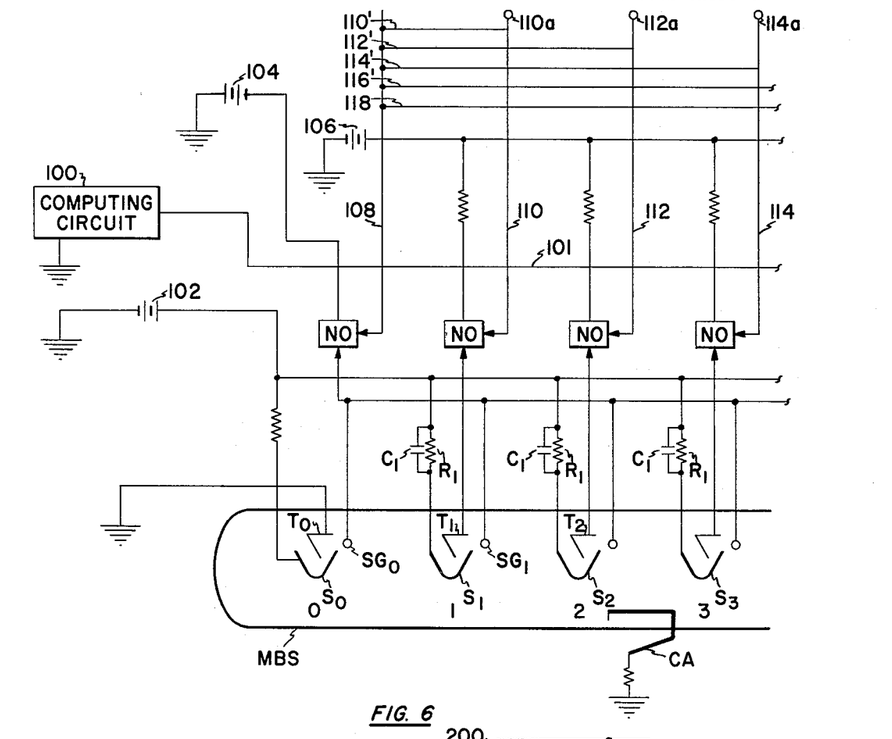
FIG. 6 is a circuit diagram showing an improved shift-register or pulse code forming device utilizing a self-oscillating beam switching tube.

The switching device illustrated in FIG. 6 utilizes a beam switching tube in the manner described and may be applied either as a shift register or a code emitter depending on what type of signals are applied to a plurality of control inputs 110a, 112a, 114a, 116a, etc. Said inputs each may control a normally open switch NO– to become closed, when a signal is present thereat, permitting any signal which may be at the outputs of the targets T1 to TN to pass to the common output line 101 which leads to a computing circuit 100 or receiver.

If the device of FIG. 6 is to be used as a shift register, the inputs 110a, 112a, 114a, etc. are connected to respective circuits over which a parallel binary code or instant pulse code is transmitted. The normally open switches NO are simultaneously closed when a pulse signal is present at the switching input to each. The beam of the magnetron beam switching tube MBS is caused to step from its zero target T0 position at a rate depending on the RC circuit of the spades and as it makes and breaks contact with each target, a pulse is produced over the target output circuit. If the normally open monostable gate NO associated with said target output has been closed as the result of a signal being at its switching input (over the respective input circuit 109a, 110a, 112a, 114a, etc.), then the pulse will be gated over the line 101. If the respective NO switch is open, no pulse will be produced over said line and the pulse train will have a so called zero interval provided in it. It can thus be seen that the instant, parallel code produced at the switching input circuits 110, 112, 114, 116, etc. is reproduced in train-form over the circuit 101. For instantaneous or rapid conversion from parallel code to pulse train code, a reproduction of any of the pulses appearing in the circuits 109 (110, 112, 114, etc.) may be used to close the normally open switch NO' by energizing its switching input via circuit 108 so that potential 104 is gated therethrough to all switching grids at once. Notation 104 refers to a source of negative potential which functions to lower the potential of all switching grids to effect the stepping or sweep of the beam. The RC constant of each spade circuit will determine the speed of switching of the beam and hence the length of the pulses developed over line 101 by maintaining the beam at each target before switching occurs.

In utilizing the device as a code emitter which will provide a predetermined pulse code or train when the input 108 is energized, the normally open switches NO– are either manually closed or closed by maintaining or omitting signals over the inputs 109 to close or maintain open switches NO– in the desired order for a sufficient period of time to permit the beam to step from the zero target position on which it is formed, to at least the final position of the particular code. Thus if the pulses produced by stepping the beam are of a microsecond duration, maintaining the switch NO' closed for about 10 microseconds will permit the beam to sweep past all 9 targets and a signal of the proper time duration is applied to NO' or the switch NO' would be sufficiently slow-to-open after closing, to permit sufficient sweep of the beam around the tube to create the desired code pulse train. Again it is noted that the circuit 101 may contain a differentiating circuit to provide all pulses of the same duration if the emitted code is to be used in a digital computing function. The first target T0 is shown connected to ground so that its output, will not be transmitted to 100 when the tube is on and the beam is not functioning to produce pulses.

Instantaneous switching or movement of the beam off zero target T0 may also be effected by providing a normally open switch NO'' in the circuit to all spades as shown in FIG. 6' having a switching input from line 108 so that when a signal appears on 108, all spades beyond position "0" suddenly become energized and are at a lower potential than spade S0 so that the beam moves off T0 and sweeps or steps past the other targets as described.

In FIG. 6', the spade S0 of the zero target position is normally connected to a source of potential 102' which provides said spade in a condition for forming the beam on T0 when the normally open switch NO'' is not energized. Upon closure of NO'' the potential 104' is gated therethrough to all spades beyond the zero position and effects stepping of the beam from target to target at a rate determined by the RC constants of each spade RC circuit. NO'' is preferably slow-to-open when closed by a pulse on line 108. The opening thereof is delayed for a sufficient period of time to permit movement of the beam past all or a predetermined number of targets to the right of the zero position or clockwise thereof. If NO'' is adapted to be closed only while a signal is present on its switching input line 108, an energizing signal other than a reproduction of one of the pulses used to trigger the other switches NO may be applied to effect said function. It is also noted that the switches NO'', and NO' or NO may also be bi-stable flip flop switches for the performance of other functions.

In FIG. 6, it is further noted that the gating switches NO may also be replaced by simply connecting or disconnecting respective of the targes to the pulse train output line 101. A device which will always emit the same pulse code when the switch NO' or NO'' is energized is thus attained. While such a device is not flexible in that the formed code does not vary, it may be used for various computing, testing or locating functions. In FIG. 6' for example, the target code transmitting line 101–C may be associated with one of a plurality of electronic devices, transmitters or components which are all connected to a common line 101'. By providing a coded or tone operated relay 200 adapted to transmit a pluse to close NO'' (or NO') when energized by the transmission of a specific code or pulse over line 101' thereto, the resulting pulse code train transmitted over 101–C and over 101' may be used to indicate the receipt of the tone or code by 200. The relay 200 in turn may be used to effect some other action when it becomes energized or the code generated in the beam switching device over line 101–C may be used for computing or control functions.

As a further note, the apparatus of FIGS. 1 to 6 may employ a semi-conductor beam switching device such as a switching transistor.

Figure 7:
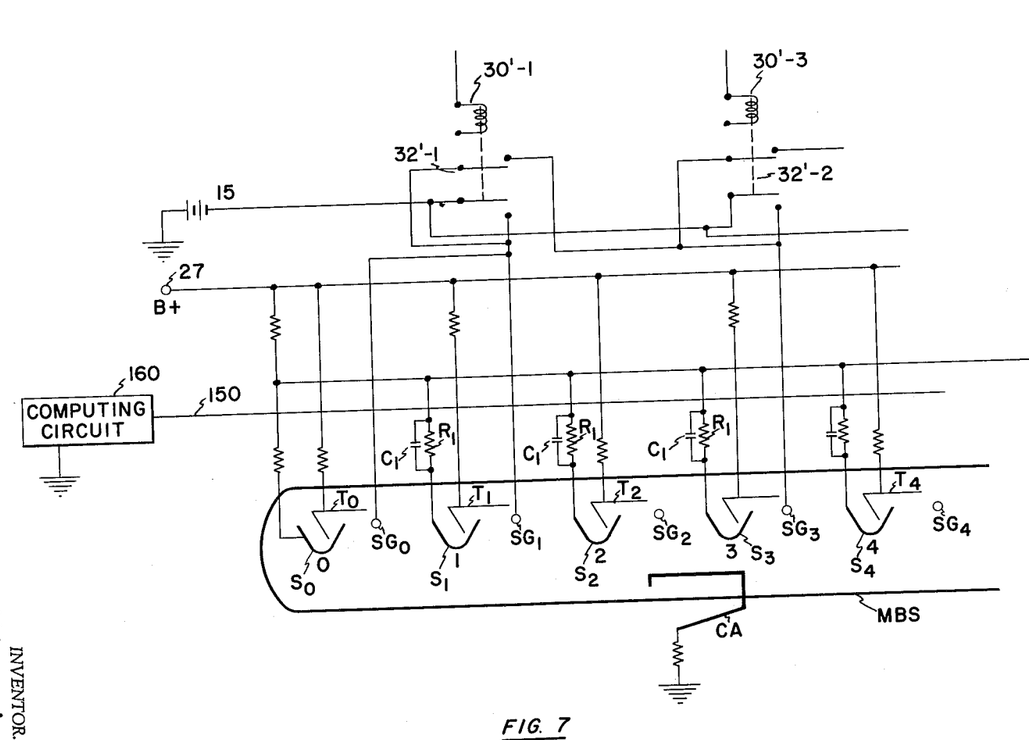
FIG. 7 is a circuit diagram showing a modification in the output line of a pulse forming device of the type illustrated in FIGS. 1 to 6. Such that a pulse is only formed thereon when the beam is present at every other target of the beam switching tube.

FIG. 7 shows a switching device similar to that of FIG. 2 with the exception that the targets of only odd positions of the beam switching tube MBS are connected to a common output line 150 while even targets are not connected thereto so that pulses produced as a result of the beam forming and leaving odd targets will be preceded and followed by time intervals which are greater than the intervals between pulses formed in the devices of FIGS. 1 to 3. As the actual time required to switch from one target position to the next is quite short, in the device of FIG. 2 the pulses developed over the circuit 51 will have very short dwell periods between pulses. In FIG. 7, since "even" positions do not have their targets connected to the output 150, the time required to switch to and from an "even" position and the time which the beam remains at said even position will be the dwell period between pulses and if the RC circuits of the spades are correctly chosen, the pulses developed by said device may be used in conventional dial operated phone selection systems.

The relays 30' of FIG. 7 replace the pushbuttons 31 of FIG. 2 although either may be used. The remainder of the circuit is similar to that of FIG. 2, whereby positional switching is effected by lowering the potential of the selected odd grid and all to the left thereof whereas odd grids to the right are not effected when the double pole monostable switch 32' is closed. The notation 160 refers to a computing or selection circuit such as a conventional telephone dial switch operated selection circuit.

It is noted that the arrangement of FIG. 7 utilizing only every other target as a means for producing a signal output on a common line may be applied to any of the hereinabove described circuits. It is also noted that the RC circuits associated with each spade for slowing the movement of the beam may vary from spade to spade to provide pulses or intervals of negative inflection in the output signal of any predetermined degree. Said variation in RC time constant may be accomplished by manual or automatic means if either the condenser C1 or resistor R1 thereof is adjustably variable. If either a shaft operated variable condenser or resistor are provided for C1 or R1 they may be adjusted manually or automatically adjusted by a servo motor to attain a selected value to control the time in which the beam remains on the associated target. The technique may be used to sample predetermined lengths of the beam particularly if the circuit of FIG. 7 or a modification thereof is employed. For example, a predetermined length of the beam may be sampled through target T1 by preadjustment of the RC circuit and after the beam steps to target T2 it may be held therefor a predetermined time until it is desired to sample the next predetermined length of the signal or segment of the beam by preadjustment of the RC constant of the spade circuit of position 2. The technique may also be employed to provide a pulse train comprising pulse and no pulse segments in a code such as one employing pulse duration measurement coding where the length of each pulse is significant. Either condenser or resistor of the RC circuit of one or more of the spades may be adjusted in value by servo motor means driving its adjustment shaft. Instantaneous adjustment may also be derived by electronic means employing, for example, an operational amplifier adapted to replace or supplement the RC circuit. If a servo motor is employed to adjust the value of the variable condenser or resistor, it may be operable in response to a command signal for positioning said shaft and feedback means may be employed to guarantee the attainment of said shaft position by means of an error signal reducing to zero.

Figure 8:
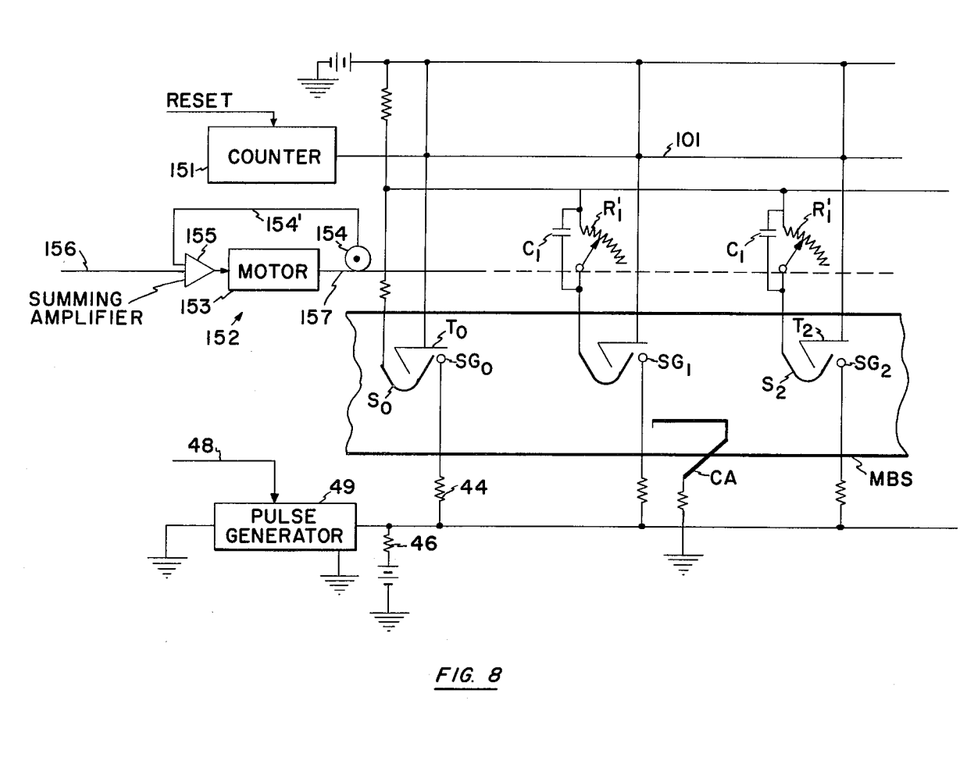
FIG. 8 is a circuit diagram of a modified measuring device.

FIG. 8 is a schematic diagram showing beam switching pulse forming apparatus provided as a digital voltmeter. In FIG. 8, each or specified of the RC circuits beyond the zero position are shown as being variable in time constant by replacing the aforedescribed fixed resistor with a variable resistor R1'. A shaft 157 of a motor 153 is geared to all potentiometer shafts and is adapted to simultaneously vary each resistor, preferably the same degree in accordance with value of a voltage applied to an input to said motor. The voltage to be measured is applied on line 156 to an error signal generator 155 which drives piston 153. The error signal generator 155 comprises a summing amplifier or the like. The difference between the actual position of the shaft 157 and the value commanded by the signal voltage on line 156 is determined by means of a feedback potentiometer 154 coupled to operate with movement of shaft 157 and the error signal fed through 155 is used to precisely position the shaft 157. The spade circuit potentiometers R1' are thus all preset to a predetermined value and the value of the voltage on line 156 may be obtained as a specific number of pulses or count as follows. After the RC constants of all spade circuits have been determined by the positioning of shaft 157 a pulse of a known duration is applied simultaneously to all switching grids. The beam formed across the tube on the zero target will start to sweep past the targets to the right of the zero position and will continue to move until said negative switching pulse on said grids is no longer present. Since the switching rate is determined by the value of the RC circuits, the number of targets the beam has passed will be a function of the value of R1', the position of the shaft 157 and hence the voltage of the signal applied to position said shaft on line 156. The notation 49 refers to a pulse generator of any known type which will generate a single pulse of known length or duration when energized.

An energizing pulse is applied on trigger input line 48 which energizes the pulse generator 49 after all variable resistors R1' have been positioned by the signal input to the motor 153. Discrete pulses are produced on target output line 101 each time the beam steps past each or every other target and these are used to actuate a counter 151, the value of which at the end of the beam sweep is proportional to the voltage applied to 153. It is noted that the counter 151 may also be the tube MBS of FIG. 8 used to effect said measurement provided that a delay line is employed in the target output circuit 101 to store the pulse train until the last pulse has been generated thereover and switching and control means are provided to convert the tube and its circuits into a counting device of known design after the beam has swept past the last target in its pulse generating function. A second pulse emitted by generator 49 just after the generation of the known duration pulse may be used to effect actuation of the switching means necessary to convert the tube into a counter so that the pulse train formed on line 101 and travelling through the delay line may be passed thereafter through the tube switching means and be counted.

The beam switching means of FIG. 2 may also be employed to start the beam formed on target T0 of FIG. 8 to oscillate or move from target to target. That is, spade switching means may be employed rather than grid switching by suddenly gating a switching potential to all spades through a normally open gate for a predetermined time interval whereby the number of pulses produced thereafter on said common target output line 101 will be a measure of the value of the RC circuit constant. The RC circuits may also be varied by means other than utilizing a variable potentiometer driven by a motor. If each resistor R1 is replaced by a triode and the unknown voltage is simultaneously applied to all triode grids, the switching rate will vary in relation to the applied voltage and the number of pulses produced on 101 will be a measure of the voltage.

It is further noted that circuits of this application employing variations in grid potential to effect switching of the beam from target to target to a selected target to provide an inflected or pulsed output on a common line may employ a means for alternately pulsing odd and even grids with a pulse source of negative potential to step said beam to said selected circuit. Connecting all even grids to one output of a flip-flop which is self oscillating once energized and energizing said flip-flop by the closure of one of the manual switches such as 16–, 30–, 60– NO or NO' of the drawings will effect such a pulse driven switching but requires the use of a flip-flop or additional driving device.

I claim:

1. An automatic signal energized pulse train generator comprising in combination a beam switching unit having a central electrode for forming an electron beam therebetween and one of a plurality of target electrodes each of which is substantially equidistant from said central electrode, each of said target electrodes having first means for forming said beam on its associated target and for advancing said beam at a predetermined time to the next target, said first means comprising a spade element and a grid element, predetermined of said targets being connectable to a common output line, a first of said targets having a spade which is normally at a potential relative to the potential of the rest of said spades such that the beam normally forms on said first target when said device is first provided in the "on" condition, and second means for advancing said beam once it is formed on said first target to any selected target in a stepping action past all of a plurality of targets from said first target to said selected target whereby a plurality of inflections are created in the signal on said common target line, said second means comprising means for simultaneously connecting to a first of said first means elements a selected number of targets in circuit with a source of switching potential whereby application of said switching potential for a short interval effectively causes said beam to move and step from target to target to said selected target, a resistance-capacitance circuit connected to each of said spades and constructed to slow down the movement of said beam from target to target whereby said beam remains longer on each target than when switching without said resistance-capacitance circuit and the duration of each pulse produced over said common output is increased.

2. Switching apparatus in accordance with claim 1, said common signal output being connected only to every other target, the remaining targets having means for effecting beam forming on each as said beam steps about said tube, whereby a pulse signal is produced over said target output circuit whenever said beam is present at a target connected thereto, and an inflection in said signal occurs during switching to and from a target not connected to said common output and while said beam is present at a target not connected to said common output.

3. Switching apparatus in accordance with claim 2 having a plurality of double pole switches each associated with a respective of said positions which have a target connected to said common output line and adapted when actuated to complete a circuit between said source of switching potential and all of said switching means to said selected position whereby the beam steps from said first target on which it is formed to a target which is not connected to said target common output whereby a discrete number of pulses are produced on said common output line each of essentially the same time duration.

4. Switching apparatus in accordance with claim 1, said resistance-capacitance circuits of said spades having constants such that the time durations of said pulse signals and the period when said beam signal is not being generated over said common output line are substantially the same whereby a digital signal may be generated for computer switching functions having a pulse train with pulse and no pulse intervals of substantially the same time duration.

5. Automatic switching apparatus in accordance with claim 4, including means for forming different codes in the form of pulse trains over said common target output circuit, said means comprising a switch in each of said target output circuits through which said beam signal may be gated when present at a respective target, means operating each of said switches in a predetermined order to gate or prevent passage of a signal therethrough, means for causing said beam to form on a first target the output of which is not connected to said common target output, and means for causing said beam to sweep past said other targets at a predetermined rate whereby a pulse train is produced which includes pulses gated to said common output when said beam is present at a target having a closed switch in its output, and a negative inflection in said signal occurs during the time said beam is not present at a target having a closed switch.

6. Automatic switching apparatus in accordance with claim 5, all of said targets connected to said common output circuit having their outputs gated through a switch, a signal input to each of said switches from a respective control circuit, means for actuating respective of said switches in a predetermined order whereby a predetermined order of opened and closed target circuits is provided to said common output and means for causing thereafter said beam to oscillate in said tube past said targets at a predetermined speed whereby a pulse train of predetermined shape is produced over said common target output having a pulse formed on said common target output whenever said beam is present at a target which has an output circuit with a closed switch, and a negative inflection in said signal is produced when said beam is present at a target having an open switch in its circuit.

7. Automatic pulse train forming apparatus in accordance with claim 5, said means for causing said beam to oscillate and produce said pulse train after said target output switches have been actuated in said predetermined order comprises in combination a source of switching potential, a normally open gate between said source of switching potential and all spade or grid switching means with the exception of the switching means of the target on which the beam of said switching tube originally forms, and means for closing said normally open switching potential source gate after said target output gates have been actuated and maintaining said switching potential gate closed for a sufficient time to permit said beam to sweep past a predetermined number of said targets, said means for closing said switching potential gate comprising gating a reproduction of at least one of the signals used to actuate said target output gates to a switching input to said switching potential gate which is slow to open thereafter.

8. Switching apparatus in accordance with claim 5, in which the switches in the output lines of said code forming targets are normally open and are constructed having a time constant such that all that are closed by a signal present at their switching inputs remain closed long enough to produce a positive inflection in the signal on said common target output line when the beam is present at the target associated with said switch yet automatically open at a time after closing such that no signal is passed through said switch due to the beam being present at said position again until the switch of said position is closed again by a second signal present at its switching input pulse train forming apparatus which comprises in combination with each target position a spade adapted for both forming a beam on said target and for advancing said beam to the next target, said spades being connectable in series circuit with each other and a source of switching potential through a plurality of switches.

9. Switching apparatus in accordance with claim 5, at least one of said spade resistance-capacitance circuits being adjustable in time constant whereby the time the beam remains on the target adjacent said spade may be adjusted so that the length of the signal gated through said target and the associated inflection in signal on said target output circuit may be adjusted to any predetermined duration in the range of adjustment of said resistance-capacitance circuit.

10. Switching apparatus in accordance with claim 5, each of said spade resistance-capacitance circuits having means for automatically adjusting the time constant thereof whereby to provide an automatic variation in the time the beam remains on the target of each spade and the length of the resulting signal gated through a respective target, said means for adjusting the time constant of said spade comprising one of said components of said resistance-capacitance circuit being adjustable while the other is fixed, an input shaft to said component adapted to effect said adjustment, servo means for operating said input shaft, an input to said servo-means including a source of a command signal adapted to drive said servo a predetermined degree whereby to adjust said resistance-capacitance circuit to a predetermined value prior to the passage of said beam across the position controlled by said spade resistance-capacitance circuit, and means for controlling said servo means to respond in a predetermined manner to said command signal and position said shaft of said component at a predetermined position.

11. In electrical apparatus, a pulse train generator comprising in combination, an electron beam switching unit having a centrally located cathode and multiple target anodes spaced substantially equidistant from said cathode, each of said target anodes having a respective electrode for beam forming at the target associated therewith, each of said target anodes being connectable to a common output circuit through a respective switch, means for forming a beam across said tube between said cathode and a first of said targets, selection means for actuating selected of said target anode switches, and means including a device for applying switching signals which cause said beam to move off said first target and to sweep thereafter past targets on one side thereof whereby a pulse train is generated over said common output circuit in accordance with the actuation of said target output line switches upon application of a single one of said switching signals, a pulse signal being generated each time said beam breaks away from one target, and forms on a second target which is connected to said common output and breaks from said second target.

12. Automatic switching apparatus in accordance with claim 11, including a switching grid associated with each of said targets, all of said switching grids being simultaneously connectable through a common grid circuit and a switch to a source of switching potential for causing said beam to switch at a predetermined rate, a first target having a spade which is at a potential respective to the rest of said spades for forming said beam on said target when said switching potential is not connected to said switching grids, said common grid circuit switch being a normally open monostable slow-to-reopen switch capable of being closed by a pulse when present at its switching input, all of said targets beyond said first target on which said beam is first formed being connected to said common target output through a respective monostable switch, each of said target output monostable switches having a respective switching signal circuit not associated with the switching circuits of the others, and means for providing signals at selected of said target switches in the form of a digital code in parallel, means for converting said code to a pulse train code comprising gating said switching potential source to all of said switching grids for a sufficient time interval to permit said beam to sweep past at least the number of targets equivalent to the number of positions in said code while maintaining said monostable switches actuated.

13. Electrical apparatus in accordance with claim 11, each of said target output switches being a monostable switch adapted to become actuated from a stable condition to close for a predetermined interval upon receipt of a signal by a switching input thereto, a further switch in circuit with a potential source and a common line connected to means at each target for advancing a beam formed on the prior target to said target, means for forming a beam of essentially constant voltage between said cathode and a first or zero target, and means simultaneously actuating selected of said monostable switches and said further switch whereby said beam automatically steps from said zero target past all targets to one side thereof while said further switch is actuated and gates said potential to said common line, there being a pulse produced over said common target output circuit whenever said beam passes a target having its monostable output switch closed.

14. In combination a beam switching tube having a plurality of targets substantially equispaced from a cathode for generating a beam across said tube to respective of said targets, a plurality of spades for forming and advancing said beam, each of said spades having a resistance-capacitance circuit associated therewith for controlling the switching rate of said beam and the time it remains on a target associated with a spade, respective ones of said resistance-capacitance circuits being adjustable in time constant by adjustment of one of its components, servo means for adjustment of a component of said adjustable resistance-capacitance circuit said servo means being responsive to a command signal, a source of command signals, means for gating respective of said command signals to respective to a servo means operatively connected to preadjust respective to said resistance-capacitance circuits prior to the movement of a beam past their targets, whereby the beam remains on each target a predetermined time interval in accordance with the adjusted time constant of its resistance-capacitance circuit.

15. Apparatus for measuring voltage and for providing said measurement as a digital signal comprising in combination, a beam switching tube having a plurality of targets equi-spaced from a central electrode, a different spade associated with each of said targets for forming a beam between said target and said central electrode, a resistance-capacitance circuit associated with each of said spades for controlling the time during which the beam remains on its target in movement from target to target, means associated with each target for causing said beam to switch to the next target, all of said switching means being connected to a common source of switching potential through a normally inoperative gate, said resistance-capacitance circuits of said spades being variable in a predetermined range, means responsive to the signal to be measured for varying the constants of all RC circuits the same degree in accordance with the value of the voltage of said signal whereby the switching rate of a beam oscillating in said tube is varied, and means after said RC circuits have been preset for gating a signal of known time duration to said switching means whereby said beam travels around said tube past a predetermined number of said targets during the time said switching signal is present, there being a pulse produced on an output line connected to respective of said targets each time said beam is present at a line connected target, the number of pulses created being an indication of the voltage of the spade circuit adjusting signal.

16. Apparatus in accordance with claim 15, including means for receiving the pulses produced on said target output line as said beam switches and for counting said pulses.

17. Apparatus in accordance with claim 16, in which the last recited means includes said switching tube, a memory device for temporarily storing the pulses produced on said target output line as said beam switches, further circuitry including switching means for converting said tube from a pulse forming circuit to a pulse counting circuit, means for automatically operating said converting switching means after the termination of said switching signal and for gating said pulse train from said delay storage means through counting means whereby an automatic count is attained of the pulses originally generated on said target output circuit.

References Cited in the file of this patent

UNITED STATES PATENTS

| | | |
|---|---|---|
| 2,398,771 | Compton | Apr. 23, 1946 |
| 2,503,127 | Mumma | Apr. 4, 1950 |
| 2,679,035 | Daniels | May 18, 1954 |
| 2,721,955 | Fan | Oct. 25, 1955 |
| 2,764,711 | Kuchinsky | Sept. 25, 1956 |
| 2,797,357 | Kuchinsky | June 25, 1957 |
| 2,802,103 | Fitzpatrick | Aug. 6, 1957 |
| 2,807,748 | Lee | Sept. 24, 1957 |
| 2,808,535 | Lee | Oct. 1, 1957 |
| 2,810,903 | Lee | Oct. 22, 1957 |
| 2,848,605 | Kuchinsky | Aug. 19, 1958 |
| 2,848,647 | Kuchinsky | Aug. 19, 1958 |
| 2,849,654 | Medoff | Aug. 26, 1958 |
| 2,871,399 | Scuitto | Jan. 27, 1959 |
| 2,876,350 | Kuchinsky | Mar. 3, 1959 |
| 2,883,531 | Anderson | Apr. 21, 1959 |
| 2,892,959 | Kuchinsky | June 30, 1959 |
| 2,899,551 | Sief | Aug. 11, 1959 |